US012394935B2

(12) United States Patent
Beshoory et al.

(10) Patent No.: US 12,394,935 B2
(45) Date of Patent: Aug. 19, 2025

(54) GALVANIC CORROSION-PROOF UNDERWATER ELECTRICAL INTERCONNECT

(71) Applicant: RAMPART PRODUCTS LLC, Houston, TX (US)

(72) Inventors: Edward J. Beshoory, Houston, TX (US); Michael A. Czuppon, Houston, TX (US); Andreas Walcher, Houston, TX (US); Daniel A. Paez, Houston, TX (US)

(73) Assignee: RAMPART PRODUCTS LLC, Houston, TX (US)

( * ) Notice: Subject to any disclaimer, the term of this patent is extended or adjusted under 35 U.S.C. 154(b) by 333 days.

(21) Appl. No.: 18/129,346

(22) Filed: Mar. 31, 2023

(65) Prior Publication Data

US 2023/0352873 A1 Nov. 2, 2023

Related U.S. Application Data

(60) Provisional application No. 63/326,015, filed on Mar. 31, 2022.

(51) Int. Cl.
*H01R 13/523* (2006.01)
*H01R 13/52* (2006.01)

(52) U.S. Cl.
CPC ....... *H01R 13/523* (2013.01); *H01R 13/5219* (2013.01)

(58) Field of Classification Search
None
See application file for complete search history.

(56) References Cited

U.S. PATENT DOCUMENTS 4,090,759 A * 5/1978 Herrmann, Jr. ........ H01R 13/53 439/279
6,475,008 B1 11/2002 Marolda et al.
(Continued)

FOREIGN PATENT DOCUMENTS

CN 203386974 U 1/2014
CN 109193250 A * 1/2019
(Continued)

OTHER PUBLICATIONS

Glenair, Inc.; "Series 70 10K PSI / 70 BAR / 7000M SeaKing (TM) High-Pressure Subsea Connectors, Cables, and PBOF Assemblies—Tools and Accessories" Marine/Subsea Catalog, 2017; p. 1.
(Continued)

*Primary Examiner* — Tho D Ta
(74) *Attorney, Agent, or Firm* — Bracewell LLP; Douglas W. Rommelmann

(57) ABSTRACT

A galvanic corrosion-proof underwater electrical interconnect comprising a plug assembly and a receptacle assembly. The plug assembly comprising a plug insert body having conductive terminals mounted within a plug shell, a coupling nut, a waterproof cable having wires connected to the conductive terminals, and a rubber overmold formed around a portion of the plug shell and cable forming a water-tight seal therebetween. The receptacle assembly comprises a first metal tubular member having a threaded portion to threadedly engage the coupling nut, a second metal tubular member separated from the first tubular member by a non-metallic outer body positioned around and between the tubular members, a receptacle insert having conductive terminals adapted to contact the plug conductive terminals. The plug shell, coupling nut and first metal tubular member are made of metal alloys having the same galvanic potential.

28 Claims, 7 Drawing Sheets

(56) References Cited

U.S. PATENT DOCUMENTS

| | | | | |
|---|---|---|---|---|
| 9,450,338 | B2 * | 9/2016 | Reeves | H01R 13/6581 |
| 10,581,198 | B2 * | 3/2020 | Seido | H01R 13/631 |
| 10,608,371 | B1 | 3/2020 | Ramotowski | |
| 2021/0344137 | A1 | 11/2021 | Cairns | |
| 2022/0050249 | A1 * | 2/2022 | Hilbeck | H01R 13/533 |

FOREIGN PATENT DOCUMENTS

| | | | | |
|---|---|---|---|---|
| CN | 211062961 | U | | 7/2020 |
| CN | 212648599 | U | | 3/2021 |
| CN | 112803193 | A | * | 5/2021 |
| EP | 0073023 | B1 | * | 12/1989 |

OTHER PUBLICATIONS

International Search Report issued in International Application No. PCT/US2023/017093 (RAM004PCT), report mail date Jul. 24, 2023; pp. 1-10.

Ramotowski, Thomas; "Cathodic Delamination of Marine Hardware: Causes and Mitigation Strategies" NAVSEA Warfare Center Newport Sensors and Sonar Systems (Code 15), undated; pp. 1-41.

Rampart Products; "Hermetic & Ruggedized Interconnects" rampartproducts.com, Jul. 30, 2021; pp. 1-9.

* cited by examiner

FIG. 1
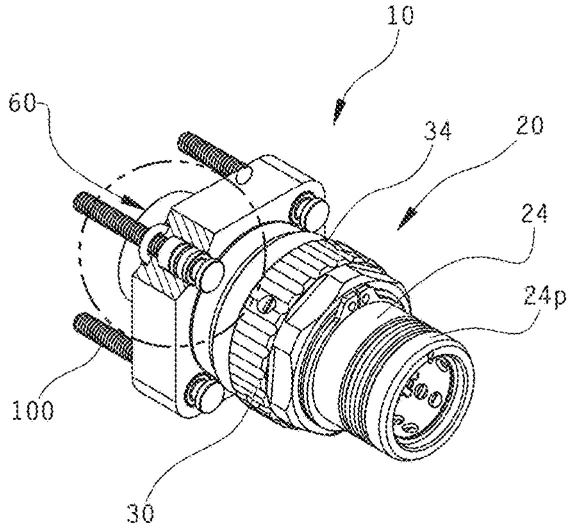
FIG. 2
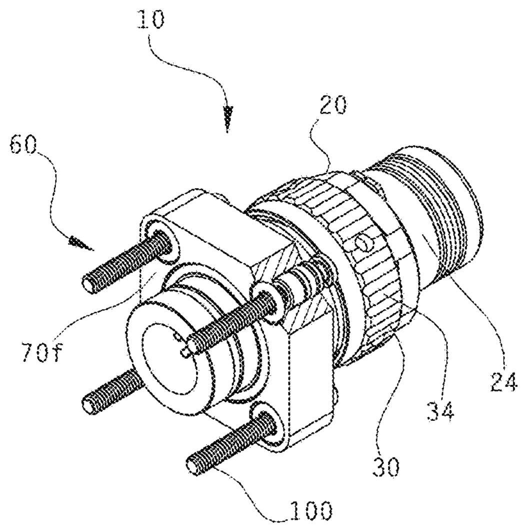
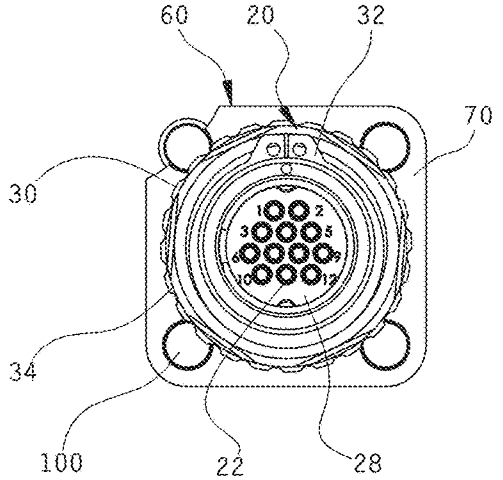
FIG. 3
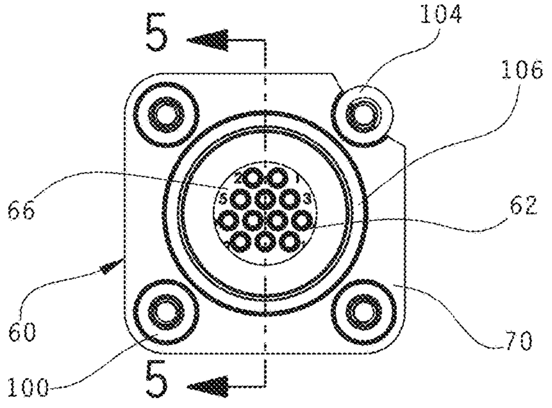
FIG. 4

GALVANIC CORROSION-PROOF UNDERWATER ELECTRICAL INTERCONNECT

CROSS-REFERENCE TO RELATED APPLICATIONS

This application claims the benefit of U.S. Provisional Application Ser. No. 63/326,015 filed on Mar. 31, 2022, entitled "Galvanic Corrosion-Proof Underwater Electrical Interconnect." Applicant incorporates by reference herein Application Ser. No. 63/326,015 in its entirety.

BACKGROUND OF THE INVENTION

1. Field of the Invention

The present invention relates generally to underwater electrical interconnects, and more specifically to galvanic corrosion-proof and cathodic delamination-proof underwater electrical interconnects.

2. Description of the Related Art

Salt water is highly conductive and causes any submerged exposed electrical component to short to ground. The purpose of an underwater electrical connector is to conduct needed electrical currents through the connector while at the same time sealing the connection to lower the risk of electrical leakage to ground. The typical underwater electrical connector is lined with synthetic rubber that blocks the ingress path of water while allowing a positive electrical connection. Additionally, such connectors may have a rubber overmold sealing the electrical cable to the connector plug.

A common failure mechanism for bonds of elastomer to metal in a saltwater environment is cathodic delamination, which is the peeling and/or flaking away of the elastomer from the metal. Underwater electrical connector cathodic delamination of the rubber overmold sealing the electrical cable to the connector plug is induced by galvanic corrosion. Galvanic corrosion can occur when two different metals are located together in a liquid electrolyte such as saltwater. Essentially, one metal's molecules are drawn toward the other metal, leading to corrosion in only one of the two metals.

In the past, electrically non-conductive coatings, epoxy- or ceramic-based, have been applied to the metal plug shell. These coatings have not been fully reliable due to issues of porosity, cracking at sharp edges, etc.

One prior art approach to overcome the cathodic delamination problem has been to embed a plastic ring containing O-ring seals between the rubber overmold and the plug shell. This system limits the rubber overmold to lower temperature processes or else the O-ring seals will be heat damaged.

A second prior art approach uses plastic shells to overcome galvanic corrosion. This system is structurally weak with high risk of fracture and subsequent system failure.

A second problem often encountered by underwater electrical interconnects is galvanic corrosion between the electrical receptacle and associated mounting hardware and the underwater structure that the electrical receptacle is mounted to. Galvanic corrosion occurs when two dissimilar metals are immersed in a conductive solution and are electrically connected. One metal (the cathode) is protected, while the other (the anode) is corroded. The rate of attack on the anode is accelerated, compared to the rate when the metal is uncoupled.

One approach at eliminating and/or reducing this problem has been to install a gasket between the receptacle shell and the underwater structure. This approach is ineffective due to only separating the galvanic couple by a small distance, while still bathed in the electrolyte (i.e., conductive solution). This approach also reduces the pressure sealing effectiveness of the system and mounting hardware, such as screws, can still be a direct link between the galvanic couples and the electrolyte.

It would be desirable to have an underwater electrical interconnect that overcomes the issue of cathodic delamination. It would also be desirable to have an underwater electrical interconnect that overcomes the issue of galvanic corrosion. Additionally, it would be desirable to have an underwater electrical interconnect that overcomes the issues of cathodic delamination and galvanic corrosion.

BRIEF DESCRIPTION OF THE SEVERAL VIEWS OF THE DRAWINGS

The invention is better understood by reading the detailed description of embodiments which follows and by examining the accompanying drawings, in which:

FIGS. 1 and 2 are perspective views of an underwater electrical connector according to a preferred embodiment of the present invention, showing a plug assembly coupled to a receptacle assembly with a portion of the receptacle assembly cut away to show fastener details;

FIG. 3 is an end view of the underwater electrical connector shown in FIGS. 1 and 2, the view taken from an end of the plug assembly;

FIG. 4 is an end view of the underwater electrical connector shown in FIGS. 1 and 2, the view taken from an end of the receptacle assembly;

DESCRIPTION OF THE PREFERRED EMBODIMENTS

It should be understood at the outset that although illustrative implementations of one or more embodiments are described below, the disclosed assemblies, systems and methods may be implemented using any number of techniques, whether currently known or not yet in existence. The disclosure should in no way be limited to the illustrative implementations, drawings, and techniques described below, but may be modified within the scope of the appended claims along with their full scope of equivalents.

The following brief definition of terms shall apply throughout the application:

The phrases “in one embodiment,” “according to one embodiment,” and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as “exemplary” or an “example,” it should be understood that refers to a non-exclusive example;

The terms “about” or “approximately” or the like, when used with a number, may mean that specific number, or alternatively, a range in proximity to the specific number, as understood by persons of skill in the field of the art;

If the specification states a component or feature “may,” “can,” “could,” “should,” “would,” “preferably,” “possibly,” “typically,” “optionally,” “for example,” “often,” or “might” (or other such language) be included or have a characteristic, that particular component or feature is not required to be included or to have the characteristic. Such component or feature may be optionally included in some embodiment, or it may be excluded.

Embodiments of the invention will now be described with reference to the figures, in which like numerals reflect like elements throughout. The terminology used in the description presented herein is not intended to be interpreted in any restrictive or limited way, simply because it is being utilized in conjunction with the detailed description of certain specific embodiments of the invention. Furthermore, embodiments of the invention may include several novel features, no single one of which is solely responsible for its desirable attributes or which is essential to practicing the invention described herein.

Figure 5:
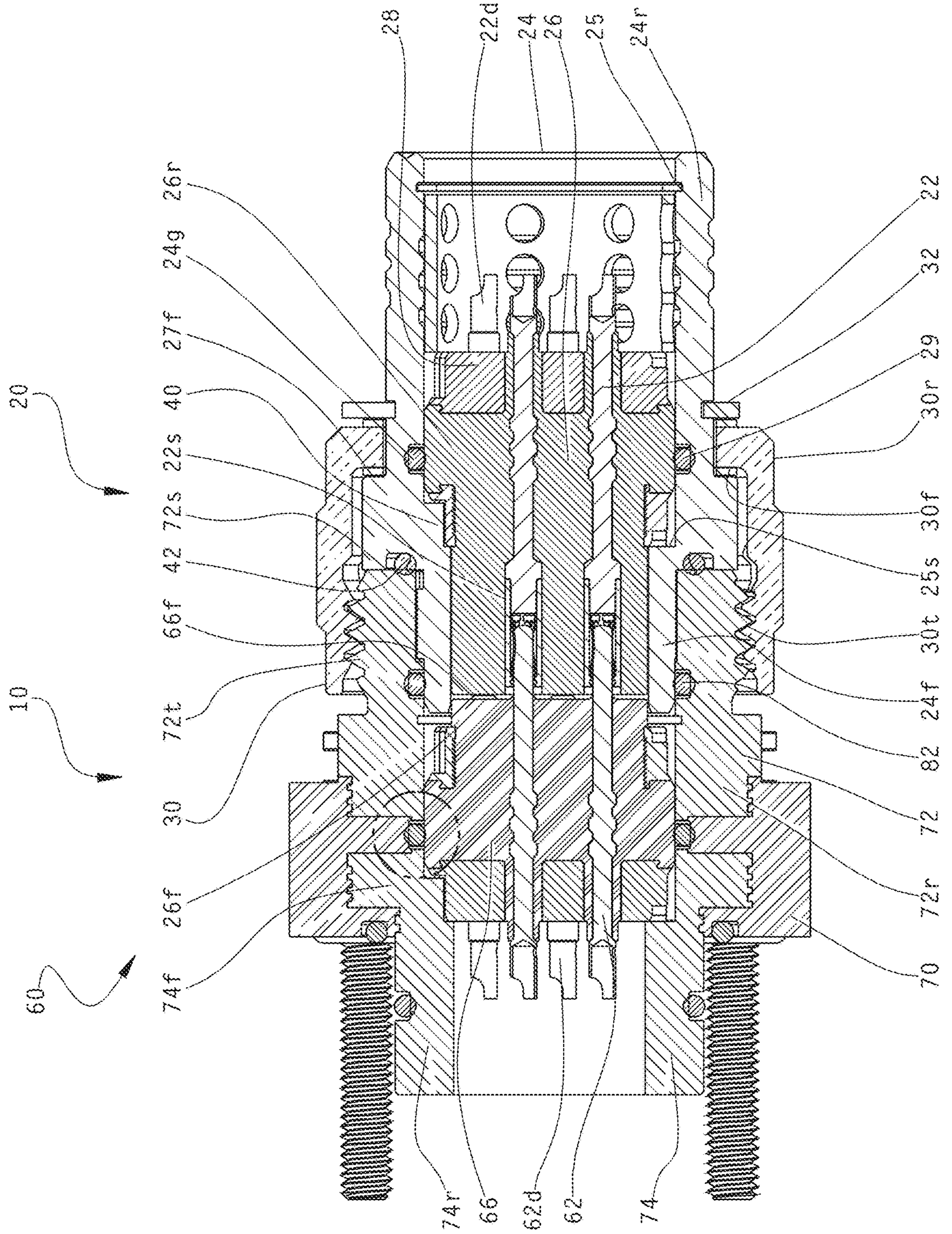
FIG. 5 is a view taken along lines 5-5 of FIG. 4.
Figure 8:
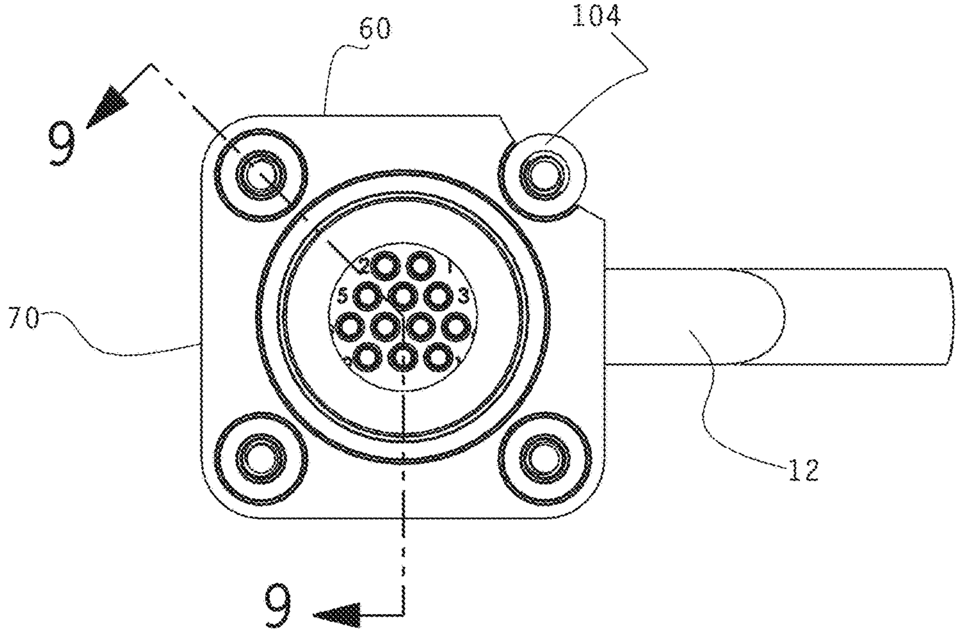
FIG. 8 is an end view of an underwater electrical connector similar to FIG. 4.
Figure 9:
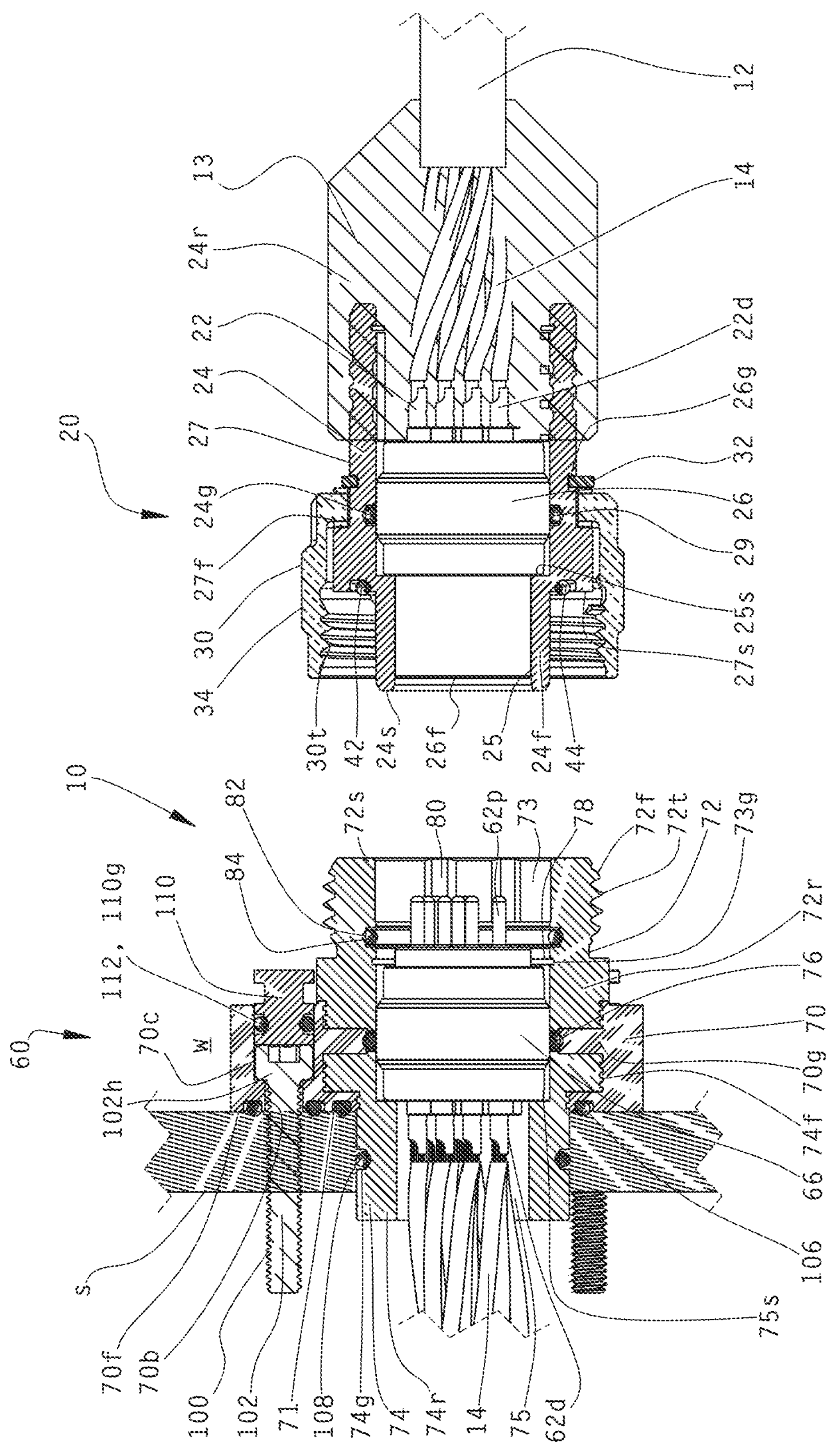
FIG. 9 is a view taken along lines 9-9 of FIG. 8, showing the plug assembly uncoupled from the receptacle assembly.

Perspective views of an underwater electrical connector according to one preferred embodiment of the present invention, generally referred to as 10, are shown in FIGS. 1 and 2. A plug assembly 20 is shown coupled to a receptacle assembly 60. FIG. 3 is an end view of the underwater electrical connector 10 shown in FIGS. 1 and 2, with the view taken from an end of the plug assembly 20 and FIG. 4 is an end view taken from an end of the receptacle assembly 60. FIG. 5 is a cross-sectional view of the underwater electrical connector 10 taken along lines 5-5 of FIG. 4. FIG. 9 is a view taken along lines 9-9 of FIG. 8 and shows the plug assembly 20 uncoupled from the receptacle assembly 60.

Referring to FIG. 5, the plug assembly 20 includes a plurality of conductive terminals 22 mounted in a plug insert body 26 and the receptacle assembly 60 preferably has a similar number of conductive terminals 62 mounted in a receptacle insert body 66. The plug insert body 26 and receptacle insert body 66 are primarily non-metallic, and more preferably made of polyetheretherketone (“PEEK”). PEEK is a high-performance engineering plastic with excellent mechanical strength and dimensional stability and has a proven track record in challenging environments. The plug insert body 26 and the receptacle insert body 66 may include a support member 28 (FIG. 5) made of metal that is inserted into a mold when injection molding the insert bodies 26, 66. As shown in FIGS. 5 and 9, the plug insert body 26 is mounted within a plug shell 24. The illustrated embodiment includes twelve conductive terminals 22 in the plug assembly 20 and twelve conductive terminals 62 in the receptacle assembly 60 as shown in the end views of FIGS. 3 and 4, respectively.

It is to be understood that the number of conductive terminals 22, 62 may be dependent on the number of required electrical connections. It is to be further understood that the conductive terminals 22, 62 are spatially arranged in a pattern such that when the plug assembly 20 is coupled to the receptacle assembly 60, there is one plug conductive terminal 22 that matingly contacts one receptacle conductive terminal 62. Additionally, preferably each plug conductive terminal 22 has a single predetermined receptacle conductive terminal 62 to matingly contact when the plug assembly 20 is coupled to the receptacle assembly 60. For example, with reference to FIGS. 3 and 4, the contacts 22, 62 are numbered 1 through 12 and like numbers will always contact each other when the assemblies 20 and 60 are coupled together. This can be achieved by spatially arranging the terminals 22, 62 in a pattern or manner that only permits one orientation in order to couple the assemblies 20 and 60. Additionally or alternatively, this may be achieved by requiring a specific orientation of the plug shell 24 relative to the first metal tubular member 72 as described below.

Referring to FIGS. 5 and 9, each receptacle conductive terminal 62 has a pin **62*p* and each plug conductive terminal 22 has a socket 22*s*. Preferably, the pins 62*p* extend axially outward from a forward face 66*f* of the receptacle insert body 66 and the sockets 22*s* are substantially flush with a forward face 26*f* of the plug insert body 26 as shown in FIG. 5. When the plug assembly 20 is coupled to the receptacle assembly 60, each pin 62*p* is received within and contacts a corresponding socket 22*s*** to form an electrical connection.

It is to be understood that the invention is not limited to pins and sockets but includes other techniques of making an electrical connection as known in the art. One such example are spring-loaded contacts, also referred to as pogos, acting on pads. It is also to be understood that the pins could be on the plug conductive terminals 22 and the sockets on the receptacle conductive terminals 62. Alternatively, there could be some combination of pins and sockets on the receptacle conductive terminals 62 and the opposite combination of pins and sockets on the plug conductive terminals 22 with each corresponding mating pair of terminals including one pin and one socket.

With reference to FIG. 9, the conductive terminals 22, 62 have distal ends **22*d*, 62*d*, opposite the socket 22*s* and pin 62*p*, extending from the plug and receptacle insert bodies 26, 66, adapted for wires 14, preferably insulated wires, to be connected, preferably by soldering, to the conductive terminals 22, 62. Although not shown, typically after the wires 14 have been soldered to the plug conductive terminals 22, the voids between the plurality of wires 14 of the electrical cable 12 in a rear portion 24*r* of the plug shell 24** are filled with epoxy potting.

In a preferred embodiment, the waterproof electrical cable 12 comprises the plurality of wires 14 that are connected to the distal end **22*d* of the plug conductive terminals 22. Preferably, a rubber overmold 13 (FIG. 9) is formed around the end of the waterproof cable 12 and the rear portion 24*r* of the plug shell 24** to form a water-tight seal.

The receptacle assembly 60 includes an outer body 70 preferably non-metallic, and more preferably made of PEEK. The receptacle assembly 60 also includes first and second metal tubular members 72 and 74, respectively. The first metal tubular member 72 has a forward portion **72*f* and a rear portion 72*r*. The forward portion 72*f* has a flat end surface 72*s* and exterior threads 72*t*. The second metal tubular member 74 has a forward portion 74*f* and a rear portion 74*r***.

Figure 7:
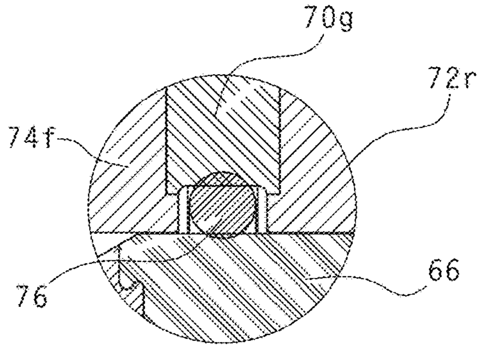
FIG. 7 is an enlarged view of the broken line portion of FIG. 5.

Preferably, the outer body 70 is molded around and contains the forward portion **74*f* of the second metal tubular member 74 and the rear portion 72*r* of the first metal tubular member 72 as shown in FIGS. 5 and 9. The outer body 70 includes a gap-forming portion 70*g* between the opposing ends of the first and second metal tubular members 72 and 74 as shown in FIGS. 5, 7 and 9. A seal 76, preferably a rubber seal, may be positioned between the gap-forming portion 70*g* and the receptacle insert body 66** as a redundant safety seal.

As shown in FIG. 9, the first metal tubular member 72 has an axial bore 73 for receiving the receptacle insert body 66. The second metal tubular member 74 has a stepped axial bore 75 defining a shoulder **75*s*. The shoulder 75*s* forms a restriction to axial movement of the receptacle insert body 66 in the direction towards the rear end 74*r* of the second metal tubular member 74. Additionally, an annular groove 73*g* may be formed in the axial bore 73 of the first metal tubular member 72 with the annular groove 73*g* adapted to receive a retaining ring 78 to prevent axial movement of the receptacle insert body 66 in the direction towards the forward end 72*f* of the first metal tubular member 72**.

Still referring to FIG. 9, the plug shell 24 has a stepped interior axial bore 25 defining a shoulder **25*s*. The shoulder 25*s* forms a restriction to axial movement of the plug insert body 26 in the direction towards a forward portion 24*f* of the plug shell 24. As shown in FIGS. 5 and 9, an annular interior groove 24*g* in the plug shell 24 is adapted to receive a seal 29 to form a seal between the plug shell 24 and the plug insert body 26**.

In one embodiment, the plug shell 24 has a stepped exterior diameter 27 comprising a first shoulder **27*f* of increased diameter and a second shoulder 27*s* of reduced diameter as shown in FIG. 9. Extending around the forward portion 24*f* of the plug shell 24 is a coupling nut 30 having an internally threaded portion 30*t*. An interior flange 30*f* is formed at a rear portion 30*r* of the coupling nut 30 as shown in FIG. 5. The interior flange 30*f* is adjacent to the first shoulder 27*f* of the plug shell 24 which restricts forward movement of the coupling nut 30 with respect to the plug shell 24. A retaining ring 32 received in a groove 26*g* of the plug shell 24 limits the rearward movement of the coupling nut 30 with respect to the plug shell 24**.

The coupling nut 30 is adapted to rotate relative to the plug shell 24. Preferably, the coupling nut 30 includes one or more gripping means 34 to facilitate rotating the coupling nut 30 as shown in FIGS. 1-3. The gripping means 34 may comprise one or more various surfaces and shapes. A few examples include, without limiting the invention, a plurality of longitudinal grooves or lines inscribed on the outer surface, a knurled outer surface, a recess or an outer shape adapted to be received by a tool or wrench, to name just a few.

In a preferred embodiment, the pins **62*p* of the conductive terminals 62 are located rearward of the flat end surface 72*s* of the first metal tubular member 72, and the forward face 26*f* of the plug insert body 26 is located adjacent to or slightly rearward of a forward end surface 24*s* of the plug shell 24 as shown in FIG. 9. Preferably, the axial bore 73 in the forward portion 72*f* of the first metal tubular member 72 includes an orientation guide 80 (FIG. 9) and the forward portion 24*f* of the plug shell 24 includes a complementary orientation guide 40 (FIG. 5). The orientation guides 40 and 80 must engage one another in order for the forward portion 24*f* of the plug shell 24 to be received within the forward portion 72*f* of the first metal tubular member 72. The guides 40, 80** may be any of a variety of engaging shapes, sizes, quantities and/or angular positions that require one orientation in order for engagement to occur. Without limiting the invention, one example may be a tongue and groove.

It is to be understood that when the orientation guides 40 and 80 are aligned for engagement, the sockets **22*s* are axially aligned with their corresponding pins 62*p*. As the plug shell 24 begins to enter the axial bore 73 of the first metal tubular member 72, the exterior threads 72*t* of the first metal tubular member 72 come into contact with the coupling nut 30. Rotation of the coupling nut 30 in one direction results in the engagement of the threaded portion 30*t* of the coupling nut 30 with the exterior threads 72*t* of the first metal tubular member 72. As the coupling nut 30 is rotated and threaded onto the first metal tubular member 72, the plug assembly 20 advances towards the receptacle assembly 60 until fully mated as shown in FIG. 5. Additionally, engaged orientation guides 40, 80 maintain the proper axial alignment and orientation of the pins 62*p* and sockets 22*s*** during this coupling process while preventing any torsional stress.

In a preferred embodiment, the second shoulder **27*s* of the plug body 24 includes an annular seal 42 received in a groove 44 and the axial bore 73 of the first metal tubular member 72 includes an annular seal 82 received in a groove 84. As shown in FIG. 5, in the coupled condition of the plug and receptacle assemblies 20 and 60, the annular seals 42 and 82 form seals between the plug shell 24 and the first metal tubular member 72**.

Figure 6:
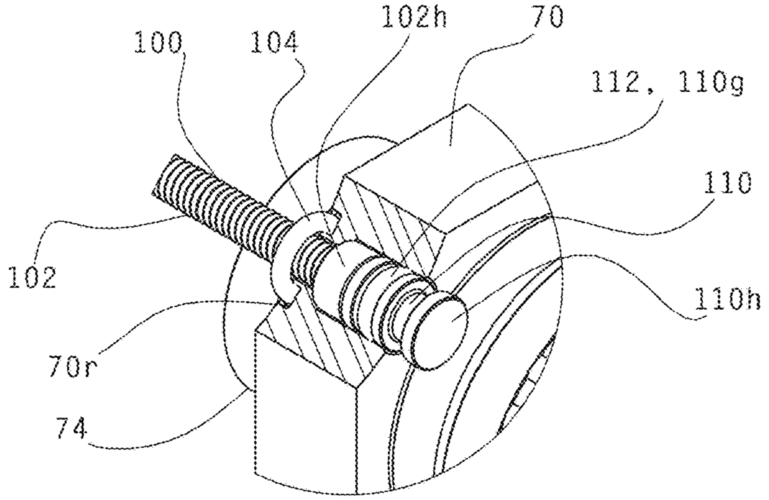
FIG. 6 is an enlarged view of the broken line portion of FIG. 1.

Referring to FIGS. 1 and 2, a plurality of mounting hardware assemblies 100 are shown. In the illustrated embodiments, four mounting hardware assemblies 100 are shown but it is to be understood that a different number of assemblies 100 may be used within the scope of the present invention. As shown in FIG. 6, the mounting hardware assembly 100 includes a fastener 102 such as a threaded screw made of metal having a head **102*h*. The outer body 70 includes a combination bore 70*b* and counterbore 70*c* for receiving each screw 102 as best shown in FIG. 9. In a preferred embodiment, the outer body 70 also includes a circular recess 70*r* (FIG. 6) around each bore 70*b* in a face 70*f* that abuts the structure S. The circular recess 70*r* is adapted to receive a seal 104, such as an O-ring, as shown in FIG. 6**.

Preferably, the outer body 70 additionally includes an annular groove 71 (FIG. 9) in the face **70*f* around the second metal tubular member 74. The annular groove 71 is adapted to receive a seal 106, such as an O-ring, as shown in FIG. 9. The structure S includes a hole for receiving the rear portion 74*r* of the second metal tubular member 74**.

In a preferred embodiment, an annular groove **74*g* adapted to receive a seal 108 may be formed in the outer surface of the rear portion 74*r* of the second metal tubular member 74, as shown in FIG. 9. The seal 108 forms a seal between the structure S and the second metal tubular member 74**.

It is to be understood that the preferred embodiments of the underwater electrical connector 10 is intended to be installed and connected when dry. The underwater structure S is preferably dry on the interior of the structure S. Preferably, the receptacle assembly 60 is installed to the underwater structure S and the plug assembly 20 is connected to the receptacle assembly 60 prior to submerging the structure S underwater or in an electrolyte.

Prior to mounting the receptacle assembly 60 to the structure S, the seal 108 is placed in the annular groove 74*g* of the second metal tubular member 74, and the seals 104 and 106 are placed in the circular recesses 70*r* and the annular groove 71 of the outer body 70. The threaded screws 102 are inserted in combination bores 70*b* and 70*c* and through corresponding screw holes in the structure S and secured to the structure S, typically via a threaded connection. With reference to FIGS. 6 and 9, following securement to the structure S, a cap 110 having a cap head 110*h* and an outer annular groove 110*g* receiving a seal 112, such as an O-ring, is inserted in the counterbore 70*c*. The seal 112 forms a watertight seal between the outer body 70 and the cap 110 preventing seawater W from access to the threaded screw 102. Preferably, the length of the cap 110 is such that the cap head 110*h* extends out of the counterbore 70*c* to facilitate removal of the cap 110, if needed. Preferably, the cap 110 is made of PEEK. Alternatively, the fastener cap 110 can be metal so long as it does not contact the fastener 102.

Figure 10:
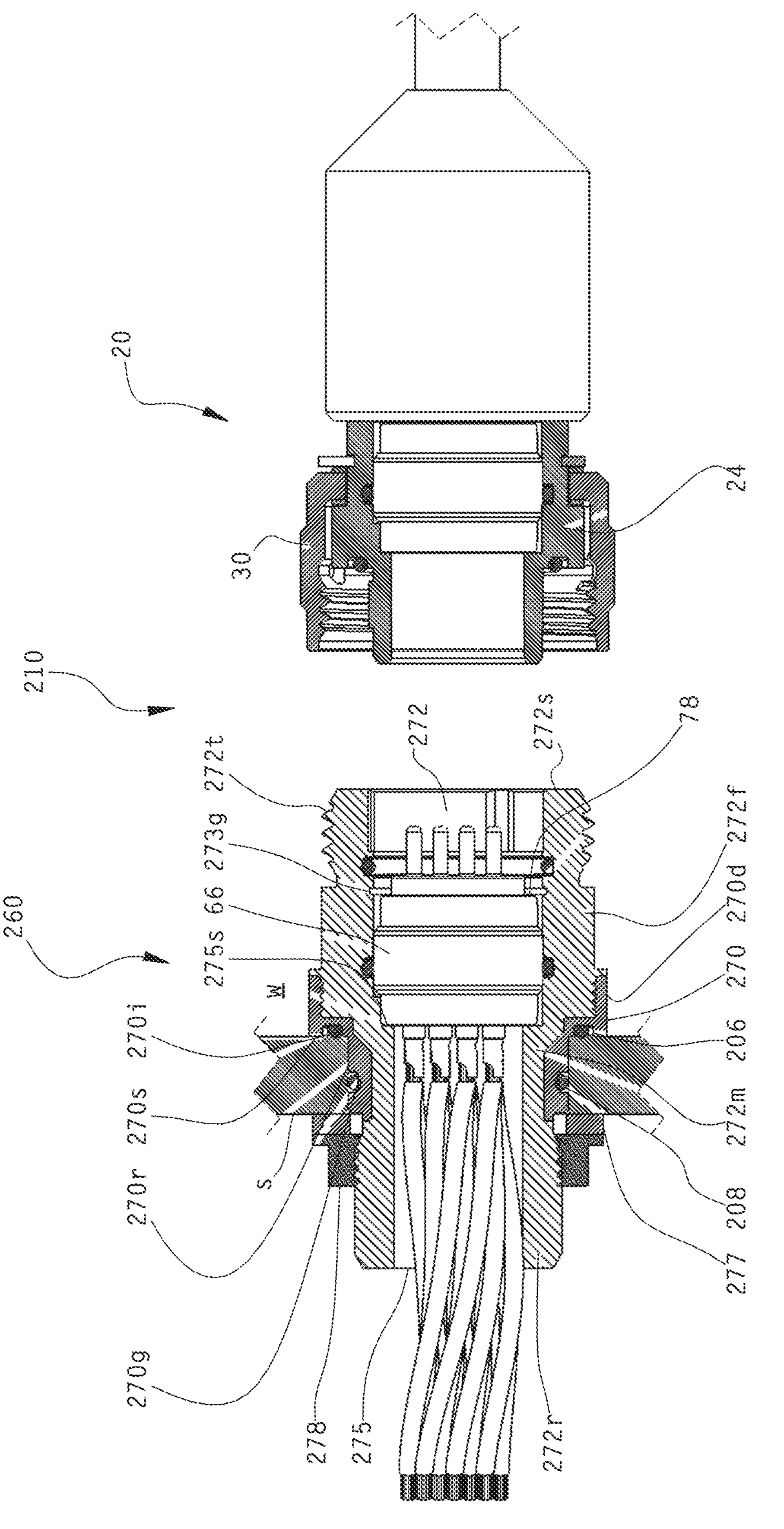
FIG. 10 is a view of another embodiment of the underwater electrical connector according to a preferred embodiment of the present invention, showing the plug assembly uncoupled from the receptacle assembly.

FIG. 10 shows another underwater electrical connector, referred to as reference number 210, according to a preferred embodiment of the present invention. In this embodiment the plug assembly 20 is the same as for the underwater electrical connector 10 but the receptacle assembly 260 has been modified. It is to be understood that portions of the receptacle assembly 260 remain the same as the receptacle assembly 60 of the first embodiment. For example, the receptacle insert body 66 is the same, and will not be again described in detail.

The receptacle assembly 260 includes an outer body 270, preferably non-metallic and preferably made of PEEK. The receptacle assembly 260 also includes a metal tubular member 272 having a forward portion 272*f*, a medial portion 272*m*, and a rear portion 272*r*. The forward portion 272*f* has a flat end surface 272*s* and exterior threads 272*t*.

As shown in FIG. 10, the metal tubular member 272 has a stepped axial bore 275 defining a shoulder 275*s*. The receptacle insert body 66 is received in the stepped axial bore 275 from the forward portion 272*f* of the metal tubular member 272 and the shoulder 275*s* forms a restriction to axial movement of the receptacle insert body 66 in the direction towards the rear portion 272*r* of the metal tubular member 272. Additionally, an annular groove 273*g* may be formed in the axial bore 275 of the metal tubular member 272 with the annular groove 273*g* adapted to receive a retaining ring 78 to prevent axial movement of the receptacle insert body 66 in the direction towards the forward end 272*f* of the metal tubular member 272.

Preferably, the outer body 270 is molded around the medial portion 272*m* of the metal tubular member 272 and has a stepped exterior diameter 270*d* comprising a shoulder 270*s* between a reduced exterior diameter portion 270*r* and an increased exterior diameter portion 270*i*. Preferably, the reduced exterior diameter portion 270*r* is sized to be received in a receptacle opening in the structure S and the shoulder 270*s* is sized to abut against the outer surface of the structure S around the receptacle opening. Preferably, one or more seal rings 206, 208 received in annular grooves 270*g* of the stepped exterior diameter 270*d* of the outer body 270 provide watertight seals between the outer body 270 and the structure S upon installation.

Still referring to FIG. 10, a washer 277, preferably made of PEEK, is sized to fit onto the rear portion 272*r* of the metal tubular member 272 and abut the inner surface of the structure S around the receptacle opening. Preferably, the rear portion 272*r* of the metal tubular member 272 includes an exterior threaded portion 274*t* and a securing nut 278 threadedly engages the exterior threaded portion 274*t* and secures the receptacle assembly 260 to the structure S.

It is to be understood that in the embodiment of FIG. 10 the metal tubular member 272 is isolated from and does not contact the structure S due to the PEEK outer body 270. Additionally, the securing nut 278 is isolated from and does not contact the structure S due to the PEEK washer 277.

It is to be understood that the plug shell 24, coupling nut 30 and metal tubular member 72, 272, are made of metal alloys having the same galvanic potential.

Figure 11:
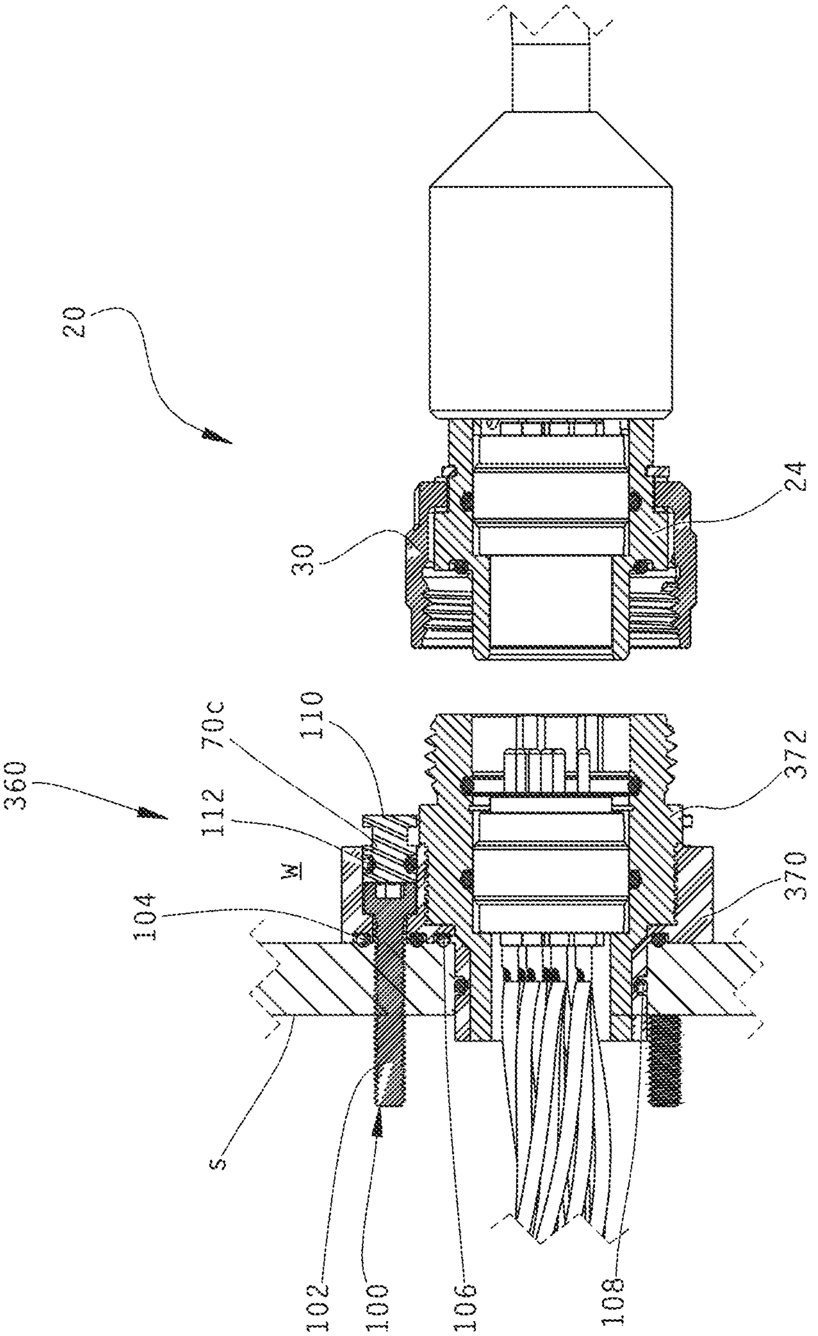
FIG. 11 is a view of another embodiment of the underwater electrical connector according to a preferred embodiment of the present invention, showing the plug assembly uncoupled from the receptacle assembly.
Figure 12:
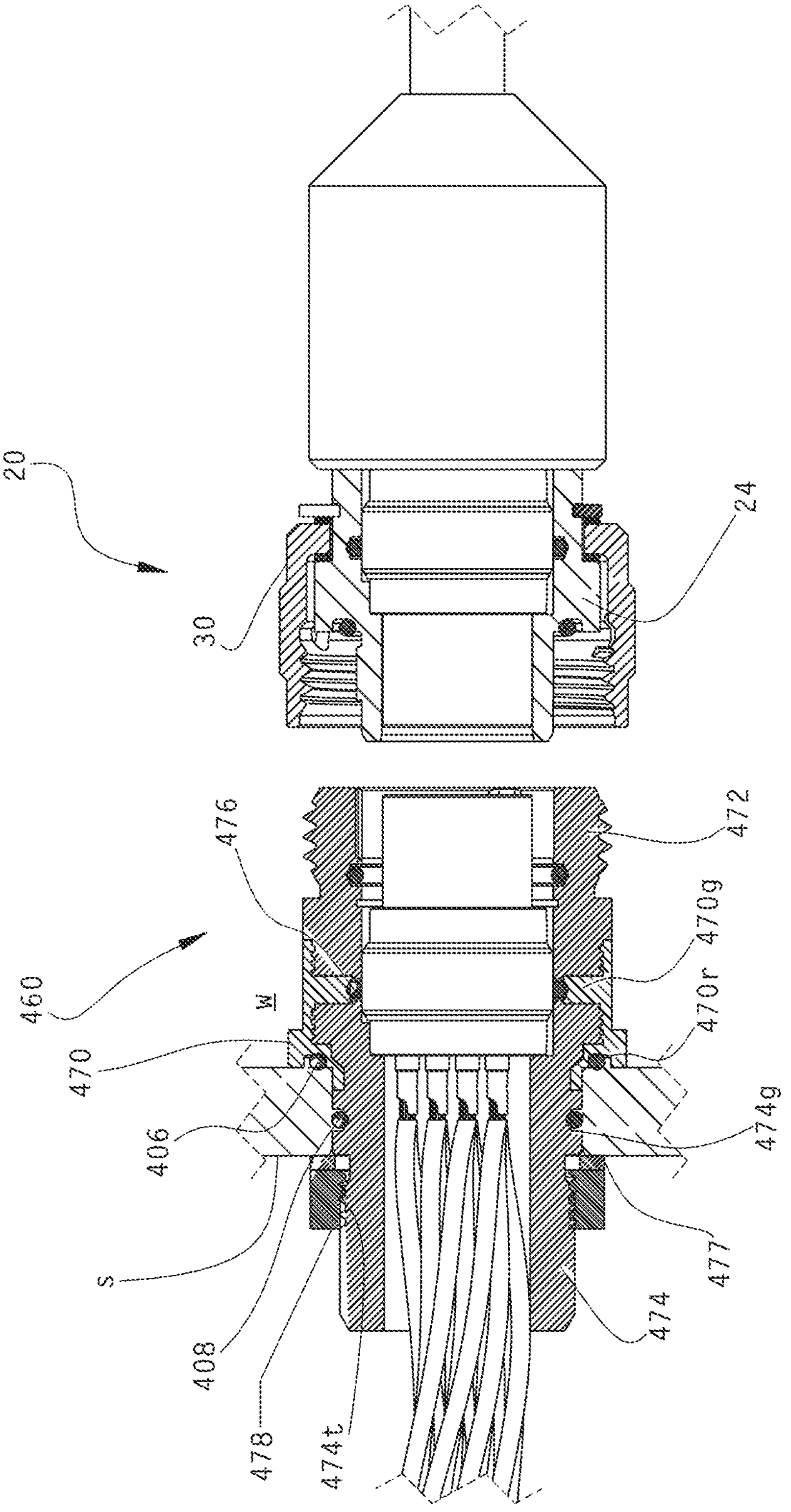
FIG. 12 is a view of another embodiment of the underwater electrical connector according to a preferred embodiment of the present invention, showing the plug assembly uncoupled from the receptacle assembly.

FIGS. 11 and 12 are views of two other embodiments of the underwater electrical connector. Similar to the embodiment shown in FIG. 10, the plug assemblies 20 in FIGS. 11 and 12 are the same as for the underwater electrical connector 10 but the receptacle assemblies 360, 460 has been modified. Only the major differences between the receptacle assemblies 360 and 460 with respect to the receptacle assemblies 60 (FIG. 9) and 260 (FIG. 10) will be described below. It is to be understood that a person of ordinary skill in the art will readily appreciate and understand the differences and how to implement each of the receptacle assemblies.

The receptacle assembly 360 in FIG. 11 has a one piece metal tubular member 372 molded within an outer body 370. The outer body 370 is preferably non-metallic and preferably formed of PEEK. Similar to the one piece metal tubular member 272 of FIG. 10, the outer body 370 prevents the metal tubular member 372 from contacting the structure S. A plurality of mounting hardware assemblies 100 are provided in a manner similar to the embodiment shown in FIGS. 1-9. As described above with respect to the receptacle assembly 60 shown in FIG. 9, a couple of seals 106 and 108 form a fluid seal between the outer body 370 and the structure S around the metal tubular member 372. Additionally, a seal 104 around each fastener 102 between the outer body 370 and the structure S and a cap 110 with a seal 112 received in a counterbore 70*c* similarly prevents the mounting hardware assemblies 100 from exposure to the seawater W.

The receptacle assembly 460 in FIG. 12 has first and second metal tubular members 472 and 474 respectively, partially within an outer body 470. Preferably, the outer body 470 is non-metallic and formed of PEEK. The outer body 470 may be molded around portions of the first and second metal tubular members 472 and 474. The outer body 470 preferably includes a gap-forming portion 470*g* between the opposing ends of the first and second metal tubular members 472 and 474. The gap-forming portion 470*g* of the outer body 470 prevents the first metal tubular member 472 from contacting the second metal tubular member 474. A seal 476, preferably a rubber seal, may be positioned between the gap-forming portion 470*g* and the receptacle insert body 66 as a redundant safety seal.

The second metal tubular member 474 is allowed to contact the structure S although it is prevented from coming into contact with the seawater W. A washer 477, which may be made of metal, may be sized to fit onto the second metal tubular member 474 and abut the inner surface of the structure S around the receptacle opening. The second metal tubular member 474 includes an exterior threaded portion 474*t*. A securing nut 478 threadedly engages the exterior threaded portion 474*t* and secures the receptacle assembly 460 to the structure S.

Preferably, a seal ring 406 is received in an annular groove 470*r* of the outer body 470 to provide a watertight seal between the outer body 470 and the structure S upon installation. Additionally, the second metal tubular member 474 may have an annular groove 474*g* for receiving a seal ring 408 forming a seal between the structure S and the second metal tubular member 474.

In the preferred embodiments of the present invention, the receptacle assembly 60, 260, 360, 460 is a plastic molded assembly containing metal components for mating to the plug assembly 20 and mounting to the structure S. Molded in metal inserts are not galvanically coupled from the seawater-exposed side to the interior of the structure S. The receptacle assembly 60, 360 also segregates mounting hardware, typically fasteners 102 such as cap screws, from seawater W thus breaking a galvanic couple and the receptacle assembly 260, 460 has the securing nut 278, 478 contained within the watertight portion of the structure S.

The plug assembly 20 uses only one metal alloy for the plug shell 24, coupling nut 30 and retaining ring 32 and it is the same as the metal alloy of the mounting thread 72*t*, 272*t* and first metal tubular member 72, 272, 372, 472 of the receptacle assembly 60, 260, 360, 460. This results in eliminating any galvanic couple between the metal components and therefore eliminates cathodic delamination of the over-molded rubber section 13.

The preferred embodiment of the present invention eliminates exposing dissimilar metals to electrolyte (e.g., seawater). Doing so 100% eliminates both galvanic corrosion between the interconnect of the plug and receptacle assemblies 20 and 60, 260, 360, 460 and the structure S it is mounted upon and cathodic delamination between the electrical cable rubber overmold 13 and the plug assembly 20.

NOMENCLATURE structure S
seawater W
underwater electrical connector 10
waterproof electrical cable 12
rubber overmold 13
wires 14
plug assembly 20
conductive terminals 22
distal ends 22*d*
socket 22*s*
plug shell 24
forward portion 24*f*
interior groove 24*g*
rear portion 24*r*
forward end surface 24*s*
stepped interior axial bore 25
shoulder 25*s*
plug insert body 26
forward face 26*f*
groove 26*g*
rearward end 26*r*
stepped exterior diameter 27
first shoulder 27*f*
second shoulder 27*s*
support member 28
seal 29
coupling nut 30
interior flange 30*f*
rear portion 30*r*
threaded portion 30*t*
retaining ring 32
gripping means 34
complementary orientation guide 40
seal 42
groove 44
receptacle assembly 60
conductive terminals 62
distal ends 62*d*
pin 62*p*
receptacle insert body 66
forward face 66*f*
outer body 70
bore 70*b*
counterbore 70*c*
face 70*f*
gap-forming portion 70*g*
circular recess 70*r*
annular groove 71
first metal tubular member 72
forward portion 72*f*
rear portion 72*r*
flat end surface 72*s*
exterior threads 72*t*
axial bore 73
annular groove 73*g*
second metal tubular member 74
forward portion 74*f*
groove 74*g*
rear portion 74*r*
stepped axial bore 75
shoulder 75*s*
seal 76
retaining ring 78
orientation guide 80
seal 82
groove 84
mounting hardware assembly 100
fastener 102
head 102*h*
seal 104
seal 106
seal 108
cap 110
outer annular groove 110*g*
cap head 110*h*
seal 112
seal ring 206
seal ring 208
underwater electrical connector 210
receptacle assembly 260
outer body 270
stepped exterior diameter 270*d*
annular grooves 270*g*
increased exterior diameter portion 270*i*
reduced exterior diameter portion 270*r*
shoulder 270*s*
metal tubular member 272
forward portion 272*f*
medial portion 272*m*
rear portion 272*r*
end surface 272*s*
exterior threads 272*t*
annular groove 273*g*
threaded portion 274*t*
stepped axial bore 275
shoulder 275*s*
washer 277
securing nut 278 receptacle assembly 360
outer body 370
metal tubular member 372
seal ring 406
seal ring 408
receptacle assembly 460
outer body 470
gap-forming portion 470*g*
annular groove 470*r*
first metal tubular member 472
second metal tubular member 474
annular groove 474*g*
exterior threaded portion 474*t*
seal 476
washer 477
securing nut 478

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. A galvanic corrosion-proof underwater electrical interconnect comprising:
- a plug assembly (20) comprising:
  - a plug shell (24);
  - a plug insert body (26) mounted within the plug shell (24), the plug insert body (26) having a plurality of plug conductive terminals (22);
  - a threaded coupling nut (30) extending around a forward portion (24*f*) of the plug shell (24); and
  - a waterproof electrical cable (12) having a plurality of wires (14) connected to the plurality of plug conductive terminals (22); and
  - a rubber overmold (13) formed around a rear portion (24*r*) of the plug shell (24) and a portion of the waterproof electrical cable (12) forming a water-tight seal therebetween; and
- a receptacle assembly (60, 460) comprising:
  - a first metal tubular member (72, 472) having a threaded forward portion (72*f*) adapted to threadedly engage the threaded coupling nut (30);
  - a second metal tubular member (74, 474);
  - a non-metallic outer body (70, 470) positioned around a rear portion (72*r*) of the first metal tubular member (72, 472) and a forward portion (74*f*) of the second metal tubular member (74, 474), the outer body (70, 470) having a gap-forming portion (70*g*, 470*g*) between opposing ends of the first and second metal tubular members (72, 472 and 74, 474) preventing contact between the first and second tubular members (72, 472 and 74, 474);
  - a receptacle insert body (66) mounted at least partially within one of the first and second tubular members (72, 472 and 74, 474) and having a plurality of receptacle conductive terminals (62),
  - wherein the plurality of plug conductive terminals (22) are adapted to contact the plurality of receptacle conductive terminals (62) upon mating engagement of the plug assembly (20) to the receptacle assembly (60, 460),
- wherein the plug shell (24), coupling nut (30) and first metal tubular member (72, 472) are made of metal alloys having the same galvanic potential.

2. The underwater electrical interconnect of claim 1, wherein the outer body (70, 470) is made of plastic.

3. The underwater electrical interconnect of claim 2, wherein the outer body (70, 470) is molded around the rear portion (72*r*) of the first metal tubular member (72, 472) and the forward portion (74*f*) of the second metal tubular member (74, 474).

4. The underwater electrical interconnect of claim 1, wherein upon installation of the receptacle assembly (60, 460) to a structure (S) and immersing the structure (S) and receptacle assembly (60, 460) in an electrolyte, the second metal tubular member (74, 474) is not exposed to the electrolyte.

5. The underwater electrical interconnect of claim 1, further comprising a seal (76, 476) positioned between the gap-forming portion (70*g*, 470*g*) and the receptacle insert body (66) and forming a fluid-tight seal therebetween.

6. The underwater electrical interconnect of claim 1, further comprising:
- the outer body (70, 470) having an annular groove (71, 470*r*) in a face (70*f*) of the outer body (70, 470); and
- a seal (106, 406) received in the annular groove (71, 470*r*),
- wherein a portion of the second metal tubular member (74, 474) is adapted to be received in a receptacle opening of a structure (S) prior to immersion of the structure (S) and the receptacle assembly (60) in an electrolyte, and the face (70*f*) is adapted to abut an outer surface of the structure (S) around the receptacle opening with the seal (106, 406) forming a fluid-tight seal between the outer surface around the receptacle opening and the outer body (70, 470).

7. The underwater electrical interconnect of claim 6, wherein the second metal tubular member (474) has an exterior threaded portion (474*t*) extending through the receptacle opening; and
- a securing nut (478) threadedly engages the exterior threaded portion (474*t*) and secures the receptacle assembly (460) to the structure (S).

8. The underwater electrical interconnect of claim 6, wherein the second metal tubular member (74, 474) is allowed to contact the structure (S).

9. The underwater electrical interconnect of claim 1, further comprising a mounting hardware assembly (100) for mounting the receptacle assembly (60) to a structure (S) prior to immersion in an electrolyte, the mounting hardware assembly (100) extending through the outer body (70) and sealed from exposure to the electrolyte,
- wherein upon installation of the receptacle assembly (60) to the structure (S), the first metal tubular member (72) is not in contact with and not galvanically coupled to the structure (S) and upon mating of the plug assembly (20) to the receptacle assembly (60), the plug shell (24), coupling nut (30) and first metal tubular member (72) are not galvanically coupled to the structure (S).

10. The underwater electrical interconnect of claim 9, wherein the mounting hardware assembly (100) comprises:

a plurality of threaded screws (102) having screw heads (102*h*) received in counterbores (70*c*) of the outer body (70); and a cap (110) with a seal (112) received in the counterbore (70*c*) forming a watertight seal between the outer body (70) and the cap (110) preventing the electrolyte from contacting the threaded screws (102).

11. The underwater electrical interconnect of claim 10, wherein the caps (110) are made of plastic.

12. The underwater electrical interconnect of claim 1, wherein the receptacle insert body (66) and the plug insert body (26) are made of plastic.

13. A galvanic corrosion-proof underwater electrical interconnect comprising:

a plug assembly (20) comprising:

a plug shell (24);

a plug insert body (26) mounted within the plug shell (24), the plug insert body (26) having a plurality of plug conductive terminals (22);

a threaded coupling nut (30) extending around a forward portion (24*f*) of the plug shell (24); and a waterproof electrical cable (12) having a plurality of wires (14) connected to the plurality of plug conductive terminals (22); and a rubber overmold (13) formed around a rear portion (24*r*) of the plug shell (24) and a portion of the waterproof electrical cable (12) forming a watertight seal therebetween; and a receptacle assembly (260, 360) comprising:

a metal tubular member (272, 372) having a threaded forward portion (272*f*) adapted to threadedly engage the threaded coupling nut (30);

a receptacle insert body (66) mounted within the metal tubular member (272, 372) and having a plurality of receptacle conductive terminals (62), wherein the plurality of plug conductive terminals (22) are adapted to contact the plurality of receptacle conductive terminals (62) upon mating engagement of the plug assembly (20) to the receptacle assembly (260, 360);

a non-metallic outer body (270, 370) positioned around a portion of the metal tubular member (272, 372), the outer body (270, 370) having a stepped exterior diameter (270*d*) comprising a shoulder (270*s*) between a reduced exterior diameter portion (270*r*) and an increased exterior diameter portion (270*i*), wherein the reduced exterior diameter portion (270*r*) is adapted to be received in a receptacle opening of a structure (S) and the shoulder (270*s*) is adapted to abut an outer surface of the structure (S) around the receptacle opening, wherein the plug shell (24), coupling nut (30) and metal tubular member (272, 372) are made of metal alloys having the same galvanic potential and the non-metallic outer body (270, 370) prevents the metal tubular member (272, 372) from contacting the structure (S).

14. The underwater electrical interconnect of claim 13, wherein the outer body (270, 370) is made of plastic.

15. The underwater electrical interconnect of claim 13, wherein the outer body (270, 370) is molded around a portion (272*m*) of the metal tubular member (272, 372).

16. The underwater electrical interconnect of claim 13, further comprising:

the outer body (270, 370) having an annular groove (71, 470*r*) in a face (70*f*) of the outer body (70, 470); and a seal ring (206, 106) received in the annular groove (71) and forming a fluid-tight seal between the outer surface around the receptacle opening and the outer body (270, 370).

17. The underwater electrical interconnect of claim 16, wherein the metal tubular member (272, 322) does not contact the structure (S).

18. The underwater electrical interconnect of claim 17, further comprising:

a non-metallic washer (277) positioned onto a rear portion (272*r*) of the metal tubular member (272) and abutting an inner surface of the structure (S) around the receptacle opening, wherein the metal tubular member (272) has an exterior threaded portion (274*t*) on the rear portion (272*r*); and a securing nut (278) threadedly engages the exterior threaded portion (274*t*) and secures the receptacle assembly (260) to the structure (S).

19. The underwater electrical interconnect of claim 13, further comprising a mounting hardware assembly (100) for mounting the receptacle assembly (360) to the structure (S) prior to immersion of the structure (S) and receptacle assembly (360) in an electrolyte, the mounting hardware assembly (100) extending through the outer body (370) and sealed from exposure to the electrolyte, wherein upon installation of the receptacle assembly (360) to the structure (S), the metal tubular member (372) is not in contact with and not galvanically coupled to the structure (S) and upon mating of the plug assembly (20) to the receptacle assembly (360), the plug shell (24), coupling nut (30) and metal tubular member (372) are not galvanically coupled to the structure (S).

20. The underwater electrical interconnect of claim 19, wherein the mounting hardware assembly (100) comprises:

a plurality of threaded screws (102), each threaded screw (102) having a screw heads (102*h*) received in counterbores (70*c*) of the outer body (370); and a plurality of caps (110), each cap (110) having a seal (112) received in the counterbore (70*c*) forming a watertight seal between the outer body (370) and the cap (110) preventing the electrolyte from contacting the threaded screws (102).

21. The underwater electrical interconnect of claim 20, wherein the caps (110) are made of plastic.

22. The underwater electrical interconnect of claim 13, wherein the receptacle insert body (66) and the plug insert body (26) are made of plastic.

23. A galvanic corrosion-proof underwater electrical interconnect comprising:

a plug assembly (20) comprising a plug shell (24), a coupling nut (30) rotatably connected to the plug shell (24), and a plug insert body (26) mounted within the plug shell (24);

a receptacle assembly (60, 260, 360, 460) adapted to be mounted to a structure (S), the receptacle assembly (60, 260, 360, 460) comprising a first metal tubular member (72, 272, 372, 472) having a forward portion (72*f*, 272*f*) adapted to engage the coupling nut (30), a receptacle insert body (66) mounted at least partially within the first metal tubular member (72, 272, 372, 472), and a non-metallic outer body (70, 270, 370, 470) mounted on the first metal tubular member (72, 272, 372, 472), wherein the non-metallic outer body (70, 270, 370, 470) is positioned between the first metal tubular member (72, 272, 372, 472) and the structure (S), and the first metal tubular member (72, 272, 372, 472) is prevented from being in contact with the structure (S).

24. The underwater electrical interconnect of claim 23, wherein the plug shell (24), coupling nut (30) and first metal tubular member (72, 272, 372, 472) are made of metal alloys having the same galvanic potential.

25. The underwater electrical interconnect of claim 24, wherein the non-metallic outer body (70, 270, 370, 470) is molded around a portion (72*r*, 272*m*) of the first metal tubular member (72, 272, 372, 472).

26. The underwater electrical interconnect of claim 23, further comprising:

a waterproof electrical cable (12) having a plurality of wires (14) connected to the plug insert body (26); and a rubber overmold (13) formed around a portion (24*r*) of the plug shell (24) and a portion of the waterproof electrical cable (12) forming a water-tight seal therebetween.

27. The underwater electrical interconnect of claim 23, further comprising a mounting hardware assembly (100) for mounting the receptacle assembly (60, 360) to the structure (S) prior to immersion of the structure (S) and receptacle assembly (60, 360) in an electrolyte, the mounting hardware assembly (100) extending through the outer body (70, 370) and sealed from exposure to the electrolyte, wherein upon installation of the receptacle assembly (60, 360) to the structure (S), the first metal tubular member (72, 372) is not in contact with and not galvanically coupled to the structure (S) and upon mating of the plug assembly (20) to the receptacle assembly (60, 360), the plug shell (24), coupling nut (30) and metal tubular member (372) are not galvanically coupled to the structure (S).

28. The underwater electrical interconnect of claim 27, wherein the mounting hardware assembly (100) comprises:

a plurality of threaded screws (102), each threaded screw (102) having a screw head (102*h*) received in counterbores (70*c*) of the outer body (370); and a plurality of caps (110), each cap (110) having a seal (112) received in the counterbore (70*c*) forming a watertight seal between the outer body (370) and the cap (110) preventing the electrolyte from contacting the threaded screws (102).

* * * * *